United States Patent
Aboalshamat et al.

(10) Patent No.: US 11,786,078 B2
(45) Date of Patent: Oct. 17, 2023

(54) DEVICE FOR TOOTHBRUSH USAGE MONITORING

(71) Applicant: Umm Al-Qura University, Makkah (SA)

(72) Inventors: Khalid Aboalshamat, Makkah (SA); Thamir Alshehri, Makkah (SA)

(73) Assignee: Umm-Al-Qura University, Makkah (SA)

( * ) Notice: Subject to any disclaimer, the term of this patent is extended or adjusted under 35 U.S.C. 154(b) by 1016 days.

(21) Appl. No.: 16/675,124

(22) Filed: Nov. 5, 2019

(65) Prior Publication Data

US 2021/0134182 A1    May 6, 2021

(51) Int. Cl.
| | | |
|---|---|---|
| *G09B 19/00* | (2006.01) | |
| *A47K 1/09* | (2006.01) | |
| *G08B 21/24* | (2006.01) | |
| *A46B 15/00* | (2006.01) | |

(52) U.S. Cl.
CPC .............. *A47K 1/09* (2013.01); *G08B 21/245* (2013.01); *G09B 19/0084* (2013.01); *A46B 15/0002* (2013.01)

(58) Field of Classification Search
CPC .... A47K 1/09; G08B 21/245; G09B 19/0084; A46B 15/0002; A46B 15/0006; A46B 15/0044; A46B 15/0012; A46B 2200/1066
See application file for complete search history.

(56) References Cited

U.S. PATENT DOCUMENTS

| | | | |
|---|---|---|---|
| 2019/0083215 A1* | 3/2019 | Serval | A46B 15/0006 |
| 2019/0215368 A1* | 7/2019 | Do | A46B 15/0004 |
| 2020/0268141 A1* | 8/2020 | Newman | A46B 15/004 |
| 2022/0304785 A1* | 9/2022 | Bevis | A46B 15/0012 |
| 2022/0331079 A1* | 10/2022 | Ogunsina | G09B 19/0084 |

\* cited by examiner

*Primary Examiner* — An T Nguyen
(74) *Attorney, Agent, or Firm* — Geeta Kadambi; RIDDHI IP LLC

(57) ABSTRACT

There is provided a device for monitoring usage of a toothbrush. The device comprises a body part, a core part and a base part. The body part comprises at least one through hole extending between an upper surface and a lower surface thereof. The core part receives the body part on an upper surface thereof and comprises on the upper surface at least one elevated portion connected to at least one force sensor which is connected to a micro-controller and which is connected to a Bluetooth transmitter. The base part for receives the core part on an upper surface thereof. A toothbrush inserted in the hole rests on the elevated portion, and a signal indicative of non-usage of the toothbrush is transmitted to the Bluetooth transmitter.

9 Claims, 7 Drawing Sheets ial device for monitoring the usage of a toothbrush which may be a manual toothbrush.

BACKGROUND

Monitoring health-related activities and general health status is a major issue in the medical field. Extensive research in this regard is currently conducted. Various devices and systems are known in the art, for measuring the time spent in doing physical exercise such as running or walking.

In the field of dental hygiene and dentistry, it is interesting to obtain similar information, for example the time spent each day tooth brushing. Devices and systems for monitoring toothbrush usage are known in the art, however, they generally relate to electric toothbrushes.

There is a need for monitoring devices for toothbrush usage that are adapted for manual toothbrushes.

SUMMARY

The present disclosure is drawn to a sensing device for monitoring the usage of a toothbrush. The toothbrush may be a manual toothbrush.

Several embodiments of the device of the invention are outlined below.

In one embodiment, this disclosure provides for a device for monitoring usage of a toothbrush. The device comprises: a body part comprising at least one through hole extending between an upper surface and a lower surface thereof; a core part for receiving the body part on an upper surface thereof, and the core part comprising on the upper surface at least one elevated portion connected to at least one force sensor which is connected to a micro-controller and which is connected to a Bluetooth transmitter; and a base part for receiving the core part on an upper surface thereof. In this embodiment, when the body part is attached to the core part, the at least one through hole is aligned with the at least one elevated portion, a toothbrush inserted in the hole rests on the elevated portion, and a signal indicative of non-usage of the toothbrush is transmitted to the Bluetooth transmitter.

In one embodiment, the upper surface of the core part is inclined and at least one groove is provided on the side of the core part, such that a liquid deposited on the upper surface of the core part flows through the groove and is received in the base part.

In one embodiment, the body part, the core part and the base part each has a cylindrical shape, the body part and the core part having substantially the same diameter which is smaller than the diameter of the base part.

In one embodiment, the core part further comprises a power switch button, a lamp power indicator, and at least one lamp sensor indicator.

In one embodiment, the body part, the core part and the base part are each made of plastic material.

In one embodiment, the core part is waterproof.

In one embodiment, the Bluetooth transmitter is connected to a mobile device and/or the Internet.

In one embodiment, this disclosure provide for a device for monitoring usage of two toothbrushes. The device comprises: a body part comprising first and second through holes each extending between an upper surface and a lower surface thereof; a core part for receiving the body part on an upper surface thereof, and the core part comprising on the upper surface first and second elevated portions, the first elevated portion being connected to a first force sensor and the second elevated portion being connected to a second force sensor, the first and second force sensors being connected to a micro-controller and which is connected to a Bluetooth transmitter; and a base part for receiving the core part on an upper surface thereof. In this embodiment, when the body part is attached to the core part, the first through hole is aligned with the first elevated portion, a toothbrush inserted in the first hole rests on the first elevated portion and a signal indicative of non-usage of the first toothbrush is transmitted to the Bluetooth transmitter, and the second through hole is aligned with the second elevated portion, a toothbrush inserted in the second hole rests on the second elevated portion and a signal indicative of non-usage of the second toothbrush is transmitted to the Bluetooth transmitter. Also in this embodiment, the upper surface of the core part is inclined and at least one groove is provided on the side the core part, such that a liquid deposited on the upper surface of the core part flows through the groove and is received in the base part.

In one embodiment, this disclosure provides for a process for monitoring usage of toothbrush. The process comprises providing a device of this disclosure, and receiving and reviewing data from a mobile phone or the Internet, the data being transmitted by the Bluetooth transmitter.

Other features will be apparent from the accompanying drawings and from the detailed description that follows.

BRIEF DESCRIPTION OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

The present disclosure is drawn to a sensing device for monitoring the usage of a toothbrush. The toothbrush may be a manual toothbrush.

Hardware of the Device

Figure 1:
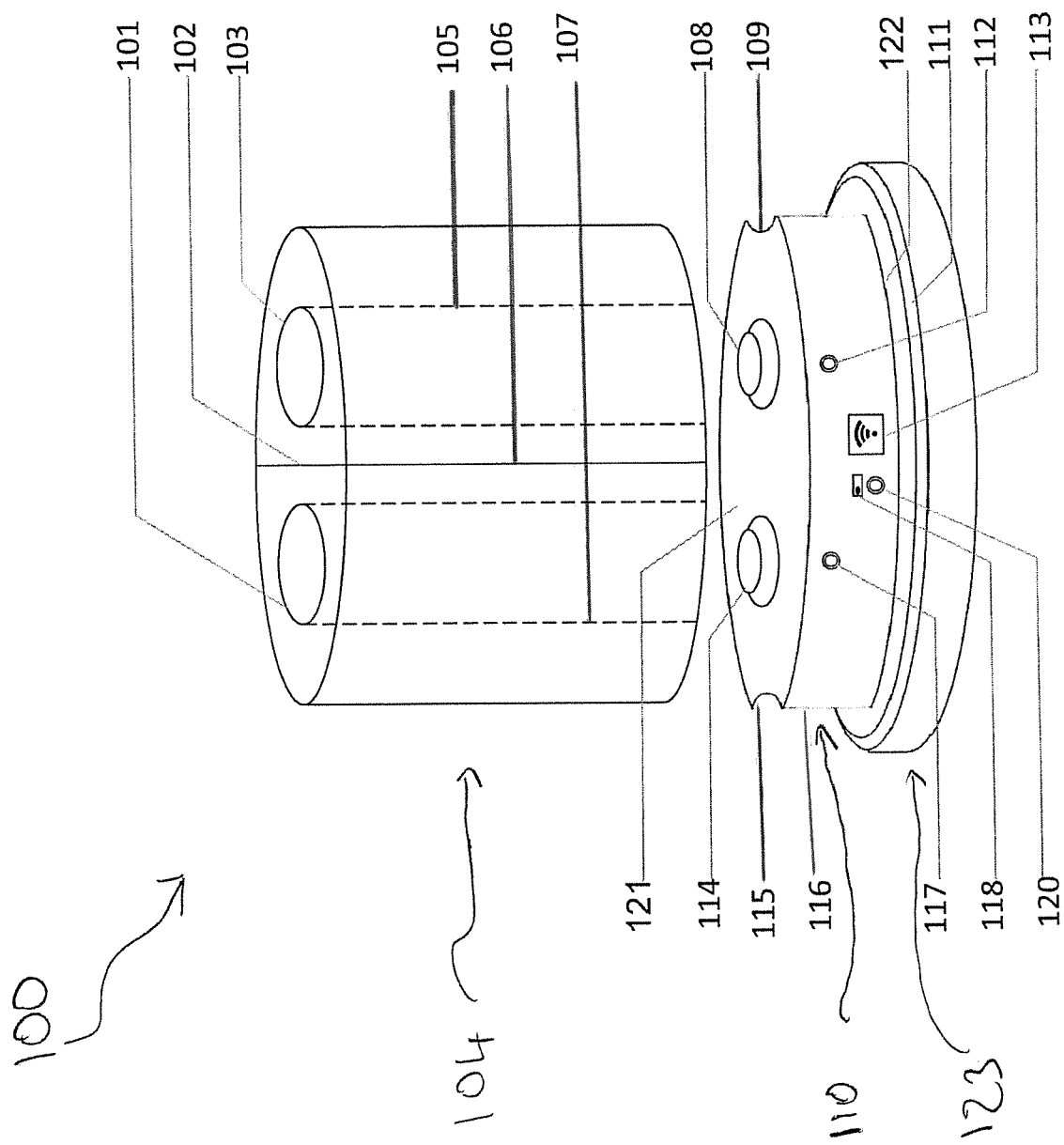
FIG. 1 is a perspective view showing the body part and the base part of an embodiment of the device of this disclosure.
Figure 2:
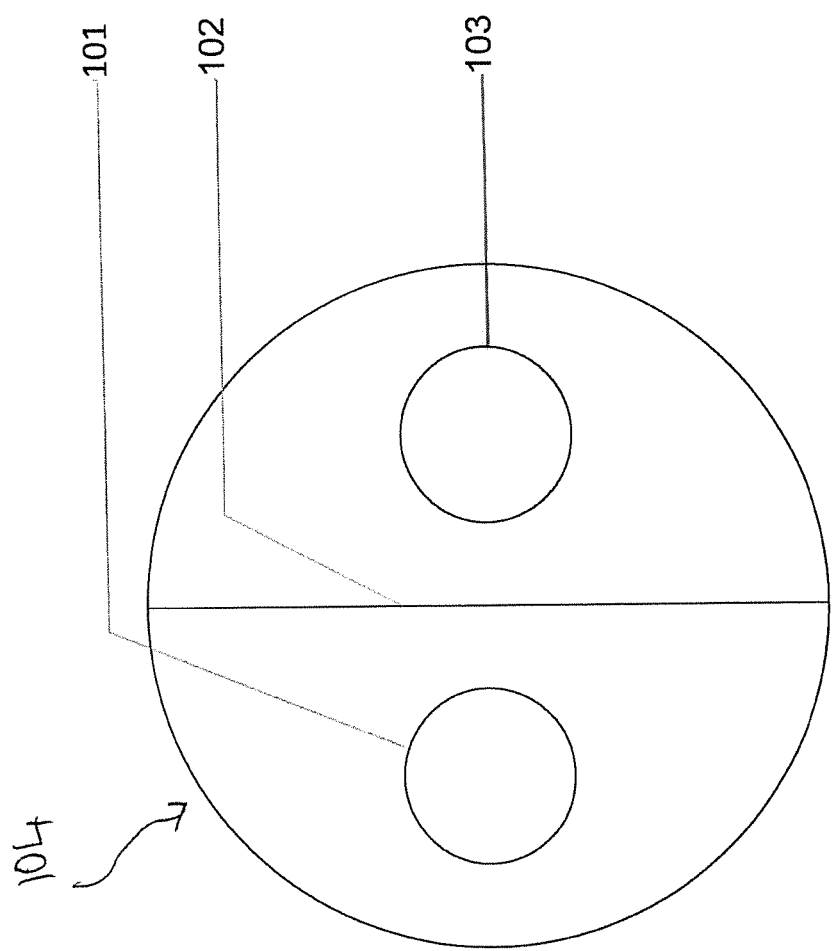
FIG. 2 is a top view showing the body part of an embodiment of the device of this disclosure.

Referring to the accompanying figures, FIG. 1 and FIG. 2 illustrate the device 100 of this disclosure. The device 100 has three main parts, namely, the body part 104, the core part 110 and the base part 123. The body part 104 has a cylindrical shape and has two toothbrush openings 101 and 103 at the top surface. The two toothbrush openings 101 and 103 extend through the body part 104 in the form of two toothbrush hollows 105 and 107, which are through holes. In other words, the toothbrush hollows 105 and 107 are open from the top of the body part 104 to its bottom. The toothbrush hollows 105 and 107 may be cylindrical. The height, shape and diameter of each hollow are adapted for receiving a toothbrush.

As will be understood by a skilled person, the body part 104 may be of any suitable shape. Also, the body part 104 may have any suitable amount of toothbrush openings, as desired. Moreover, the toothbrush hollows may have any suitable shape, as desired, which allows for the reception of a toothbrush.

FIG. 1 also shows the second part of the device of this disclosure, which is the core part 110. The core part 110 has a generally cylindrical shape and its height is smaller than the height of the body part 104. Grooves 109 and 115 are provided on opposite sides of the core part 110. The core part 110 has a diameter which is substantially the same as the diameter of the body part 104. The core part 110 is attached to the third part of the device of this disclosure, which is the base part 123.

The base part 123 is also cylindrically shaped and has a height smaller than the height of the core part 110, and a diameter larger than the diameter of the base part 110 or the body part 104.

As will be understood by a skilled person, the respective shape of the body part 104, the core part 110 and the base part 123 may, independently, be of any suitable shape that allows for the interconnection of the three parts, as will be described in more detail below. Also, their respective height may vary suitably, as desired.

More features of the core part 110 are illustrated in FIG. 1. On the top of the core part 110, there are two dome-shaped parts 108 and 114. On the frontal face of the core part 110, there are three lamps, namely, lamp 112 which is the activity indicator of a first sensor, lamp 117 which is the activity indicator of a second sensor, and lamp 120 which is the activity indicator of the whole device 100. Also, on the frontal face of the core part 110, there is a signal sign 113 which is indicator for the Bluetooth transmitter (318 in FIG. 3). Moreover, on the frontal face of the core part 110, there is a switch button 118.

As will be understood by a skilled person, the number of dome-shaped parts and the number of lamps sensor indicators depend on the number of hollows for receiving the toothbrushes. Accordingly, the number of dome-shaped parts, lamps and sensors will vary depending on the number of toothbrush hollows provided in the device.

Figure 3:
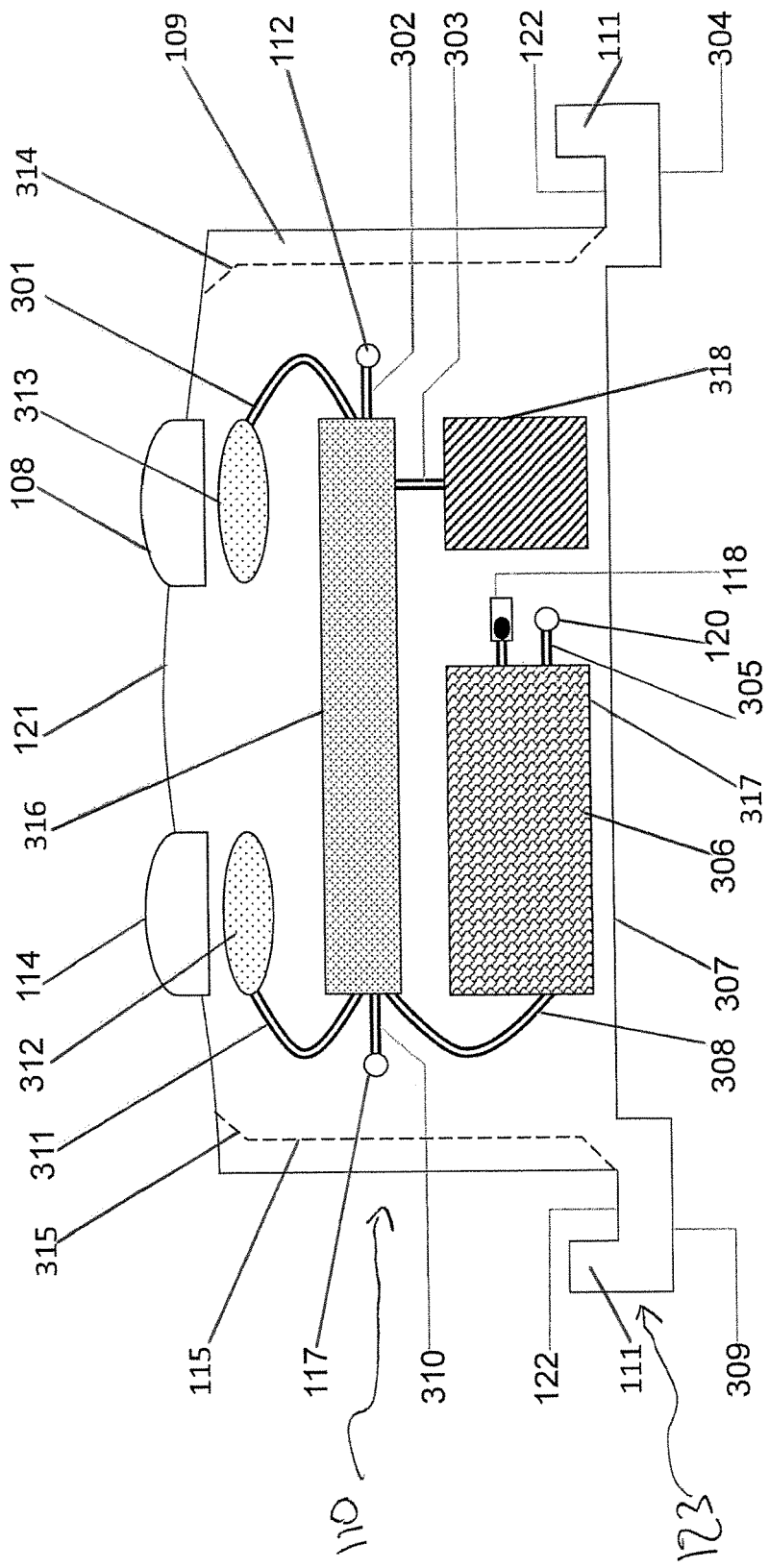
FIG. 3 is a side view showing the core and the base part of an embodiment of the device of this disclosure.
Figure 5:
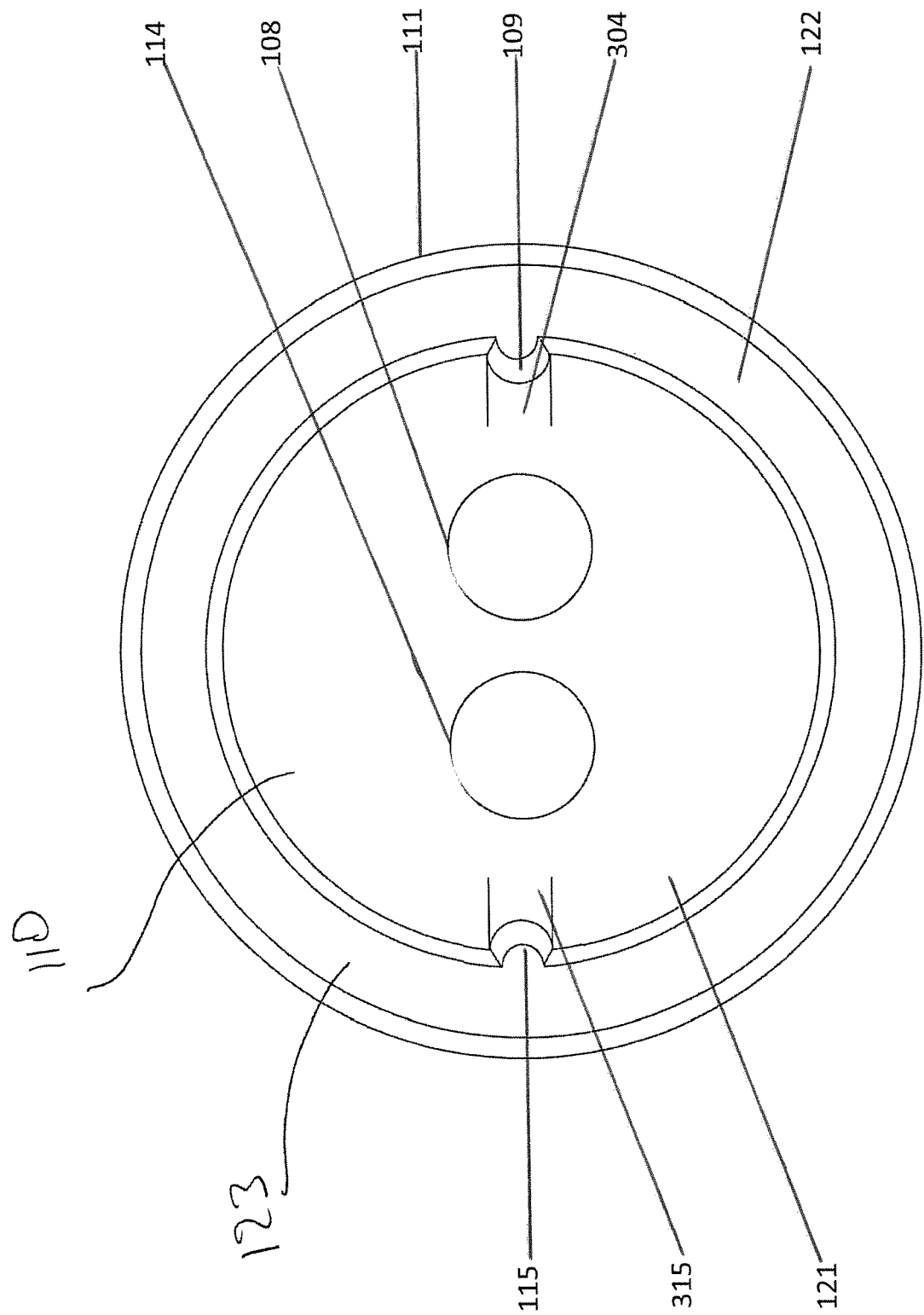
FIG. 5 is a top view showing the core part and base part of an embodiment of the device of this disclosure.

More features of the core part 110 and the attached base part 123 are illustrated in FIG. 3 and FIG. 5. The top surface for the core part 121 is not flat, but rather is dome-shaped with the largest height at the center. At opposite sides of the core part 110, there are small inclinations 314 and 315 which extend through the core part in the form of two side grooves 109 and 115. The side grooves 109 and 115 end in a circular pool 122 provided in the base part 123. The circular pool 122 is bounded by a pool elevation 111 provided in the base part 123.

FIG. 3 illustrates the inner parts of the core part 110. As indicated above, there are dome-shaped parts 108 and 114 at the top surface of the core part 110. Right beneath the dome-shaped parts 108 and 114, there are two force sensitive sensors 313 and 312. The sensors 313 and 312 are connected by electrical wires 301 and 311 to a micro-controller board 316. The micro-controller board 316 is connected by electric wires 302 and 310 to the two sensor indicator lamps 112 and 117. The micro-controller board 316 is also connected to the Bluetooth transmitter 318 by electrical wire 303. The Bluetooth transmitter 318 faces the signal sign 113 from outside. The micro-controller board 316 is also connected by electric wire 308 to a battery module 306 which is for example an AA battery module. The battery module 306 is connected by electric wire 317 to power switch 118. The battery module 306 is connected by electric wire 305 to the power indicator lamp 120.

As may be seen on FIG. 3, when the device rests on a support (surface of a bathroom counter for example), the base part 123 does not completely contact the support. Only an outer circular section 304 thereof contacts the support, while an inner section 307 remains spaced apart from the support.

Figure 4:
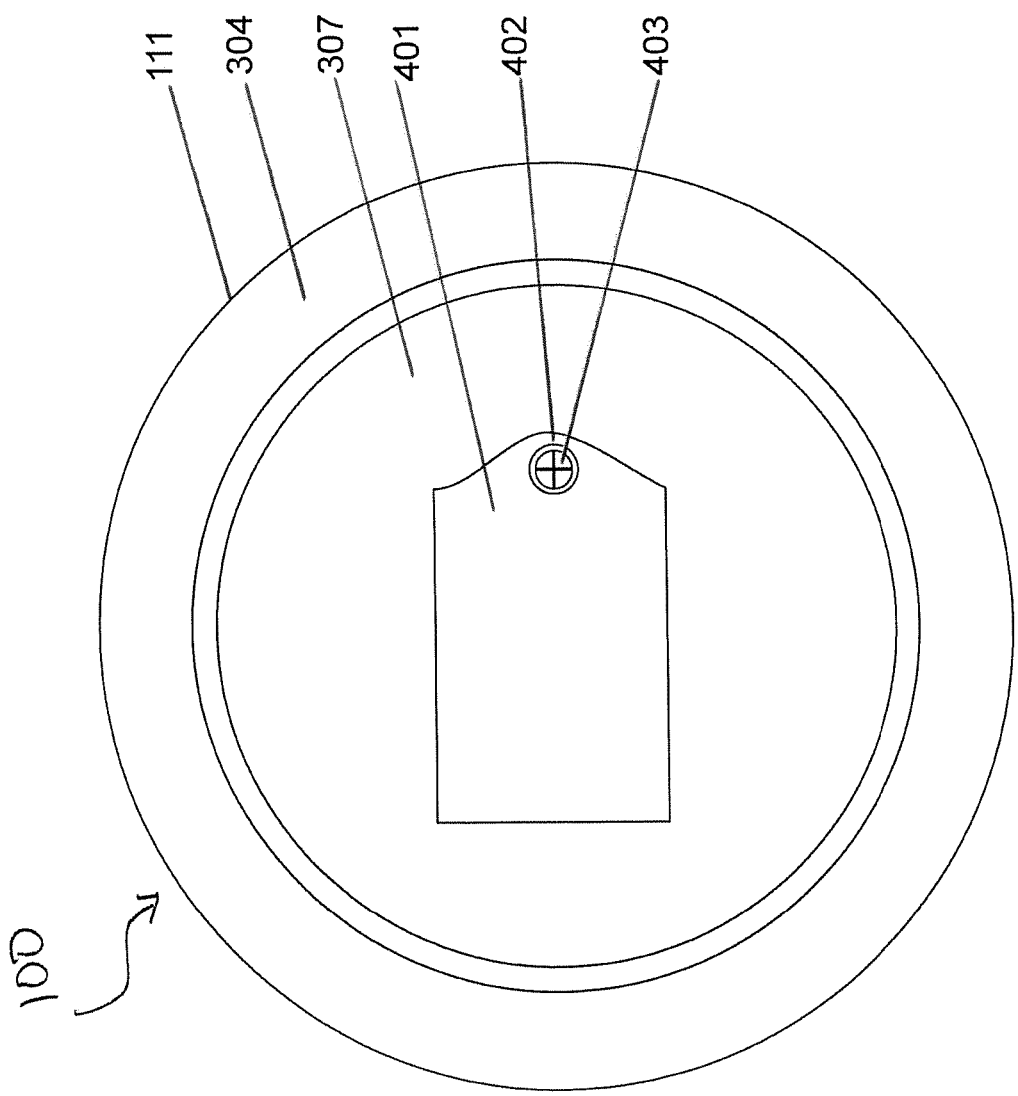
FIG. 4 is a bottom view showing the base part of an embodiment of the device of this disclosure.

FIG. 4 illustrates the bottom view of the base part 123. A battery cover 401 is provided. The battery cover 401 has a screw hole 402, where the battery screw 403 is inserted.

Figure 6:
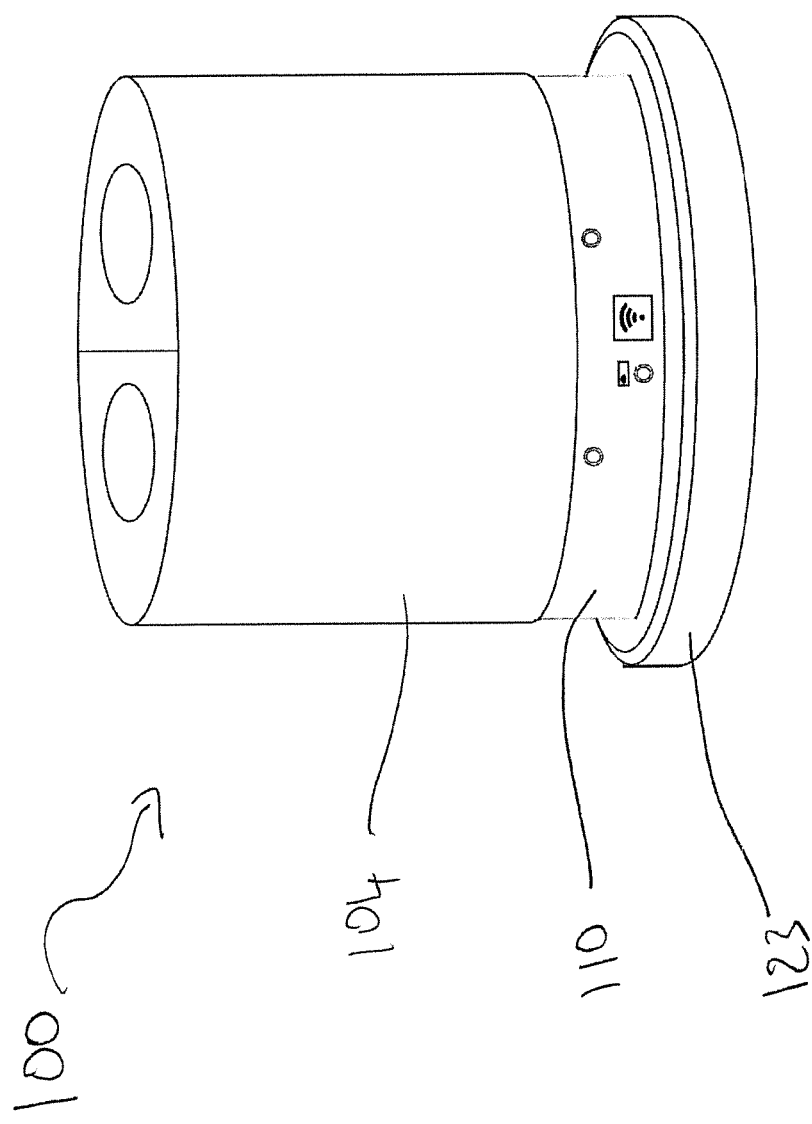
FIG. 6 is a perspective view showing the connection of the body part, the core part and the base part of an embodiment of the device of this disclosure.

FIG. 6 illustrates the overall device 100. The core part 110 and the base part 123 are attached together by the manufacture. In other words, the core part 110 and the base part 123 may be permanently attached. The core part 110 and the base part 123 may be made of plastic material, and covered by a soft water proof plastic insulator layer to prevent water from entering the interior of the device which contains the electronic part. The body part 104 is a separate part that may be attached and detached from the core part 110, for example for cleaning purposes. In other words, the body part 104 and the core part 110 may be removably attached together.

Use of the Device and Data Flow

Figure 7:
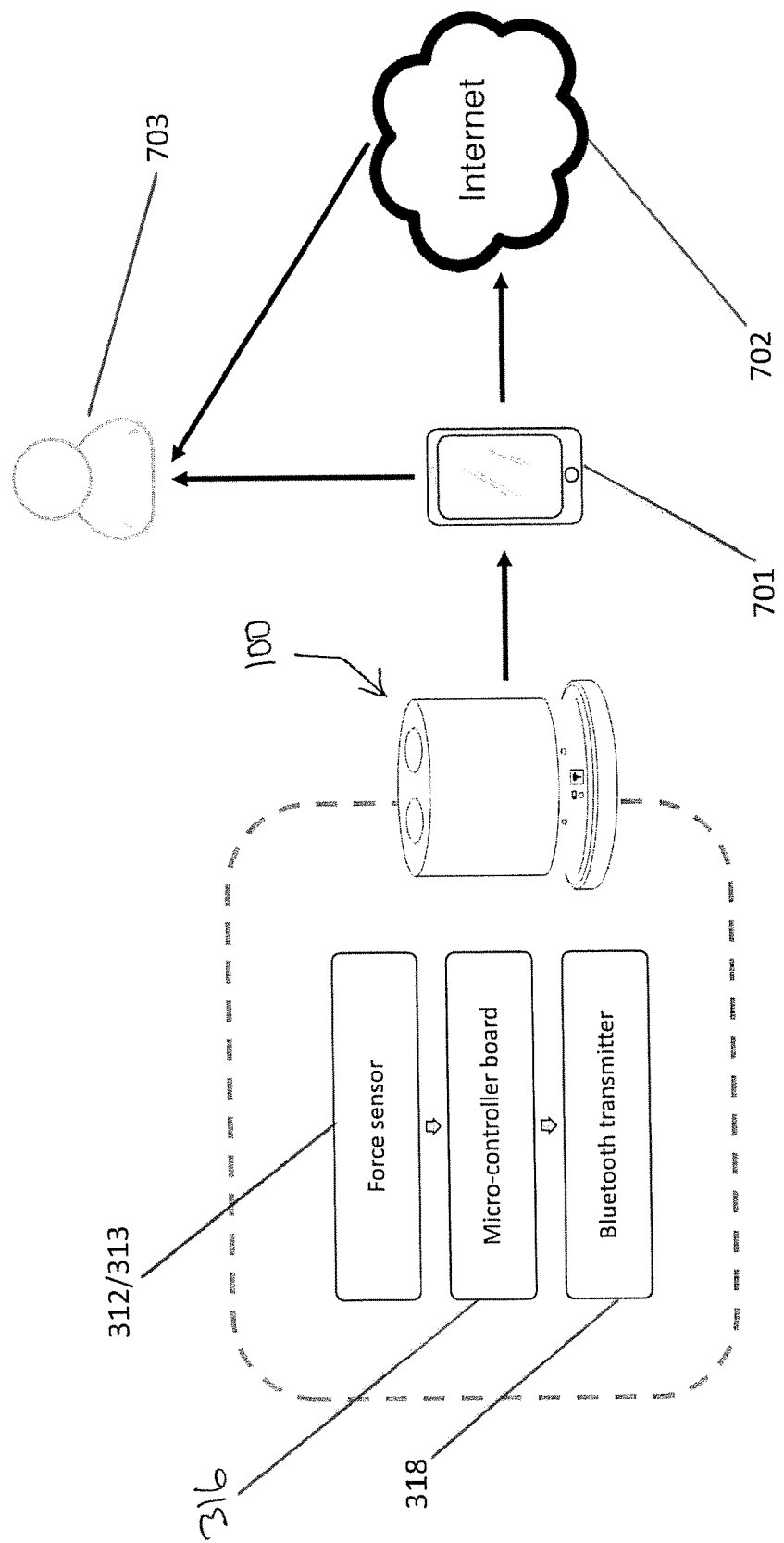
FIG. 7 is a diagram showing the flow of data in connection with an embodiment of the device of this disclosure.

Still referring to the accompanying figures, in FIG. 7 a device user 703 uses the device 100 to monitor his/her toothbrush usage. For example the user 703 may monitor the duration and frequency of use of the toothbrush. In the embodiment presented, usage of two toothbrushes may be monitored simultaneously. As will be understood by a skilled person, the design of the device may be modified to increase or decrease the number of toothbrush.

In the following embodiment, one toothbrush is used to describe the process of this disclosure.

The device is supplied by batteries, AA batteries for example, in the battery module 306. Once the batteries are in place, the device is ready to work. When the device is turned on by using the power switch 118, the power indicator lamp 120 gives a continuous light signal. When the batteries reach a certain percentage of their capacity, for example 10% of their capacity, the power indicator lamp 120 will give a flash light to warn the user 703 to change the batteries. As will be understood by a skilled person, the device may also be powered by any other suitable power source different from batteries.

A toothbrush is inserted in a toothbrush hollow 105 or 107. When the tooth brush is inside the toothbrush hollow 105 or 107, the toothbrush exerts a force on dome-shape 108 or 114 attached to the force sensor 313 or 312. A signal is transmitted into the micro-controller board 316. This is the non-active mode. The signal will prevent any further signaling to the sensor indicator lamp 112 or 117 (lights are off), or to the Bluetooth transmitter 318 (no signal is sent).

When the user 703 picks up his/her toothbrush, i.e., removes the toothbrush from the toothbrush hollow, no force is exerted on the dome-shaped part 108 or 114. Accordingly, there is no force on the force sensitive sensor 313 or 312. This activates the force sensitive sensor 313 or 312 and a different signal is sent to the micro-controller board 316. The micro-controller board 316 will send a signal to the sensor indicator lamp 112 or 117 which will thus be turned on. The micro-controller board 316 will also send data to the Bluetooth transmitter 318. Such data include for example the time period during which the sensor is active. The Bluetooth transmitter 318 will start to send the data to a mobile device 301 and/or to the cloud internet 302. This process will stay active until the user 307 puts his/her toothbrush back into the toothbrush hollow 105 or 107. At that time, the signal will be stopped (non-active mode).

The micro-controller board 316 is programed to detect the activity of two toothbrushes at the same time, without interference. The force sensitive sensors 313 and 312 are programed to detect the average weight of a toothbrush. The weight of the dome shape parts 108 and 114 are taken into consideration.

The design of the device described in this disclosure takes into consideration the water drops that drip from the toothbrush after the usage. Such water will drip in the toothbrush hollow 105 or 107 and drop on the top surface 121 of the core part 110. As described above, this surface is inclined; the water will thus migrate to the side, exit through the small inclinations 314 and 315, and then continue into the two side grooves 109 and 115. The water drops will end in the circular pool 122 in the base part 123 (FIG. 4 and FIG. 5). Accordingly, the water is kept away from the core part 110, and does not interfere, for example by adding more weight on the force sensitive sensor 313 or 312.

Although the present embodiments have been described with reference to specific example embodiments, it will be evident that various modifications and changes may be made to these embodiments without departing from the broader spirit and scope of the various embodiments.

This disclosure refers to a number of documents, the content of which is herein incorporated by reference in their entirety.

INDUSTRIAL APPLICABILITY

The sensing device of this disclosure may find various applications in the field of dentistry. The device may be used with any toothbrush including a manual toothbrush.

Accordingly, the specification and drawings are to be regarded in an illustrative rather than a restrictive sense.

What is claimed is:

1. A device for monitoring usage of a toothbrush, comprising:
   a body part comprising at least one through hole extending between an upper surface and a lower surface thereof;
   a core part for receiving the body part on an upper surface thereof, and the core part comprising on the upper surface at least one elevated portion connected to at least one force sensor which is connected to a micro-controller and which is connected to a Bluetooth transmitter; and
   a base part for receiving the core part on an upper surface thereof;
   wherein when the body part is attached to the core part, the at least one through hole is aligned with the at least one elevated portion, a toothbrush inserted in the hole rests on the elevated portion, and a signal indicative of non-usage of the toothbrush is transmitted to the Bluetooth transmitter.

2. The device of claim 1, wherein the upper surface of the core part is inclined and at least one groove is provided on the side of the core part, such that a liquid deposited on the upper surface of the core part flows through the groove and is received in the base part.

3. The device of claim 1, wherein the body part, the core part and the base part each has a cylindrical shape, the body part and the core part having substantially the same diameter which is smaller than the diameter of the base part.

4. The device of claim 1, wherein the core part further comprises a power switch button, a lamp power indicator, and at least one lamp sensor indicator.

5. The device of claim 1, wherein the body part, the core part and the base part are each made of plastic material.

6. The device of claim 1, wherein the core part is waterproof.

7. The device of claim 1, wherein the Bluetooth transmitter is connected to a mobile device and/or the Internet.

8. The device of claim 1, comprising first and second through holes, the first through hole being aligned with a first elevated portion which is connected to a first force sensor, and the second through hole being aligned with a second elevated portion which is connected to a second force sensor.

9. A process for monitoring usage of two toothbrushes, comprising:
   providing a device comprising:
      a body part comprising at least one through hole extending between an upper surface and a lower surface thereof;
      a core part for receiving the body part on an upper surface thereof, and the core part comprising on the upper surface at least one elevated portion connected to at least one force sensor which is connected to a micro-controller and which is connected to a Bluetooth transmitter; and
      a base part for receiving the core part on an upper surface thereof;
      wherein when the body part is attached to the core part, the at least one through hole is aligned with the at least one elevated portion, a toothbrush inserted in the hole rests on the elevated portion, and a signal indicative of non-usage of the toothbrush is transmitted to the Bluetooth transmitter; and
   receiving and reviewing data from a mobile phone or the Internet, the data being transmitted by the Bluetooth transmitter.

* * * * *